June 24, 1969 W. BECKER 3,452,187

DEVICE FOR ELECTROMAGNETICALLY TRANSFORMING BINARY VALUES INTO DECIMAL VALUES

Filed Feb. 15, 1966 Sheet 1 of 5

INVENTOR
WILLY BECKER

By [signature]

INVENTOR
WILLY BECKER

By [signature]

INVENTOR
WILLY BECKER

By Walter Becker

INVENTOR
WILLY BECKER

By
Walter Becker

INVENTOR
WILLY BECKER

By

Walter Becker

United States Patent Office 3,452,187
Patented June 24, 1969

3,452,187

DEVICE FOR ELECTROMAGNETICALLY TRANSFORMING BINARY VALUES INTO DECIMAL VALUES

Willy Becker, Behringersdorf, near Nuremberg, Germany, assignor to Diehl, Nuremberg, Germany
Filed Feb. 15, 1966, Ser. No. 527,416
Claims priority, application Germany, Feb. 17, 1965, D 46,532; Aug. 6, 1965, D 47,912
Int. Cl. G06f 5/02; H04l 3/00; H03k 13/02
U.S. Cl. 235—155 22 Claims The present invention relates to a device for electromechanically converting binary coded values into decimal values. More specifically, the invention is concerned with a device for electrically converting binary coded values in 1–2–4–8 or 8–4–2–1 code into decimal values while the binary values are for instance presented in all digits simultaneously, however, in each digit according to their weight or partial value in series.

Figure 1C:
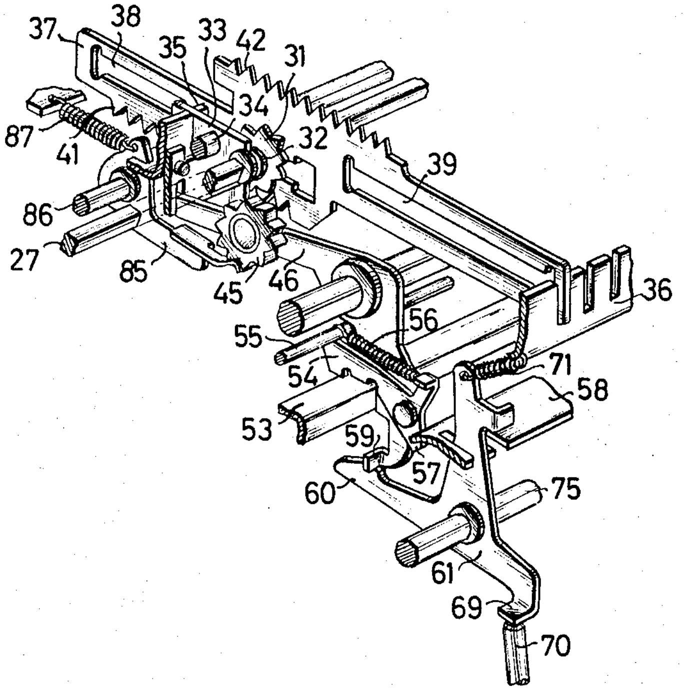

In addition to purely electrically or electronically operated devices such as relay decoding devices, decoding matrices etc., electromagnetically operated converter mechanisms in which a mechanical storing member is displaced by a measured distance corresponding to the value to be decoded are also known to the art.

It is important how the binary values are presented by the calculating machine, as for instance by a fully electronically operating calculator or the output network thereof. The output may, for instance, be effected in all decimal digits simultaneously and within each decimal digit in parallel. However, the output may also be effected in series, i.e. in all decimal digits and within each of the decimal digits consecutively.

The device according to the present invention is based on a partial combination of the above mentioned two possibilities, in which all decimal digits are fed simultaneously but in which within the individual decimal digits the binary bits are fed one after another in conformity with their weight or partial value.

It is, therefore, an object of the present invention to provide a device for electromechanically converting binary coded values into decimal values by means of which a mechanically driven output mechanism, especially a printing mechanism, may be fed.

When employing the original binary code 1–2–4–8 or 8–4–2–1 in each digit, a total of 8+4+2+1=15 adjusting steps are required for carrying out all necessary combinations of numbers. However, the stress on the adjusting means is already relatively high at the customary printing speed of from five to seven lines per second. It is, therefore, desirable to carry out in each digit or numeral place the absolutely necessary steps only. Thus, for the input of values actually only nine steps are required. A code adapted to this number of steps has already become known, namely the 2–4–2–1 code. Since an electronic computer normally effects the output in conformity with the code 8–4–2–1, it is necessary to convert the binary values already available in the code of the electronic computer first into the above mentioned code 2–4–2–1. For this purpose so-called converting stages, for instance in the form of matrices, were required. The expense for such converting stages is, however, relatively high.

It is, therefore, a further object of the present invention to develop a special code which on one hand avoids as far as possible all unnecessary steps and which on the other hand makes it possible to feed a decoding transmission directly with the 8–4–2–1 code without necessitating any code converting stages.

It is a still further object of the present invention to provide a device for electromechanically converting binary coded values into decimal values, which makes it possible to print not only the values 0 to 9 but also a comma and a period. In other words, it is intended not to limit the printing mechanism to the printing of the nine digits but to accommodate two further adjusting steps for a comma and a period, i.e. the printing mechanism is to be equipped for eleven adjusting steps.

Figure 1A:
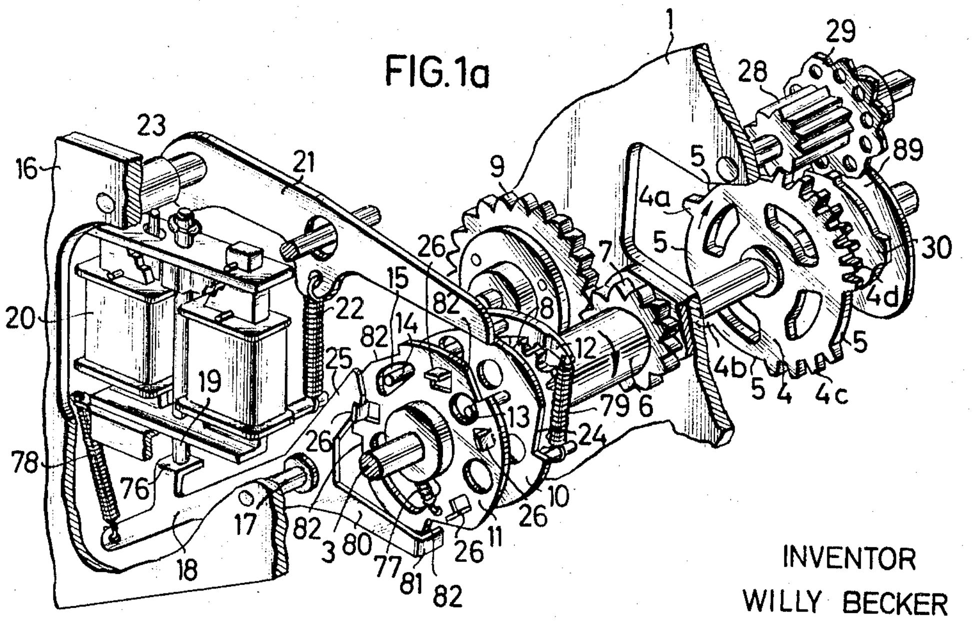
Figure 1B:
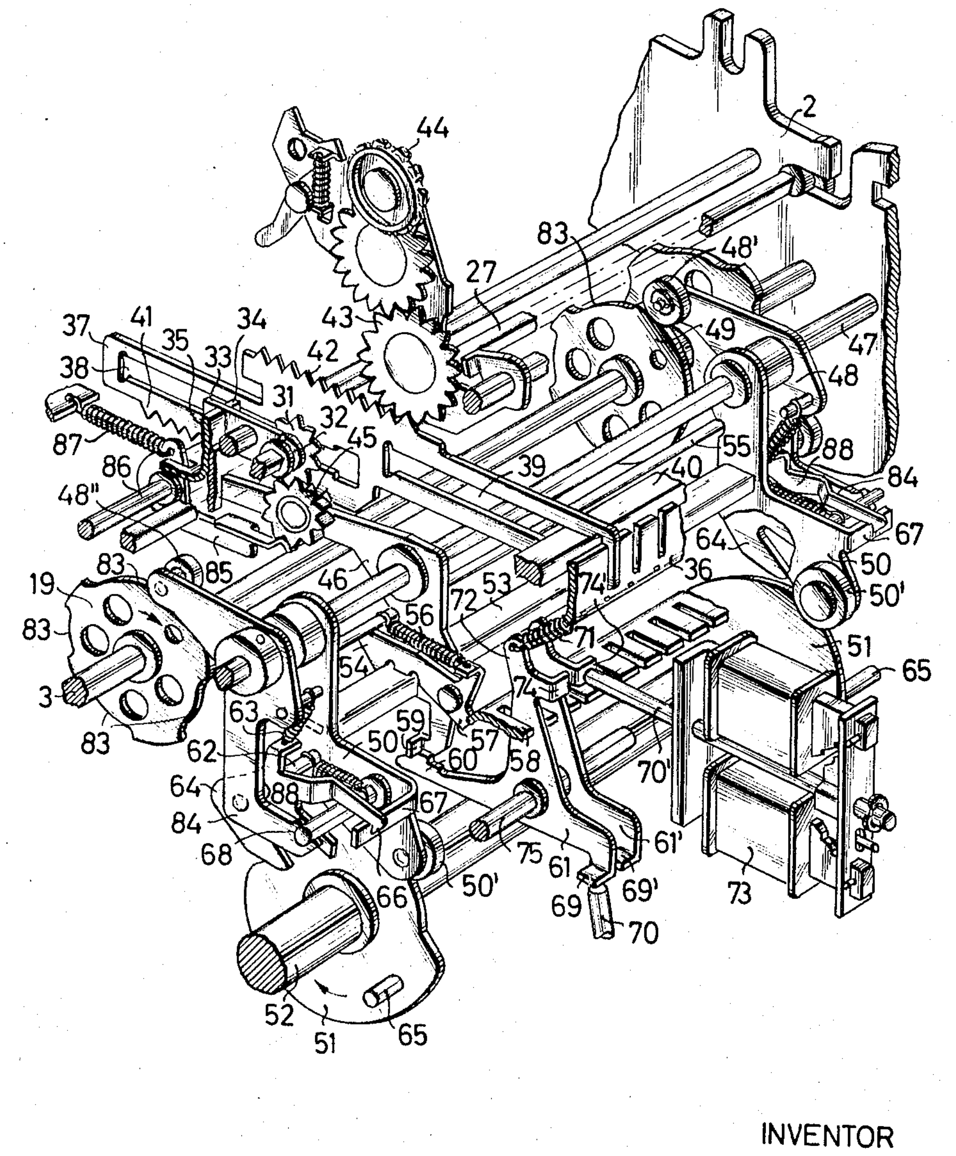

These and other objects and advantages of the invention will appear more clearly from the following specification in connection with the accompanying drawings, in which:

FIGS. 1*a*, 1*b*, 1*c* represent three isometric views of a decoding device according to the present invention in the starting position thereof and, more specifically:

FIG. 1*a* shows the left-hand portion of a control device for driving the arrangement in a stepwise manner and a value converting transmission;

FIG. 1*b* shows the right-hand portion of the decoding device with an arrangement for respectively making the counting mechanisms effective and ineffective, and also showing the value storing and printing members of the device for one digit;

FIG. 1*c* shows in greater detail the central portion of FIG. 1*b* during processing of a binary "0."

Figure 2C:
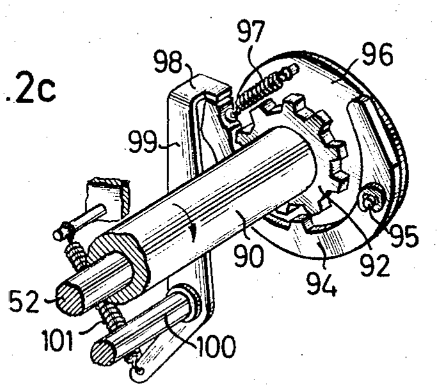
Figures 2A, 2B:
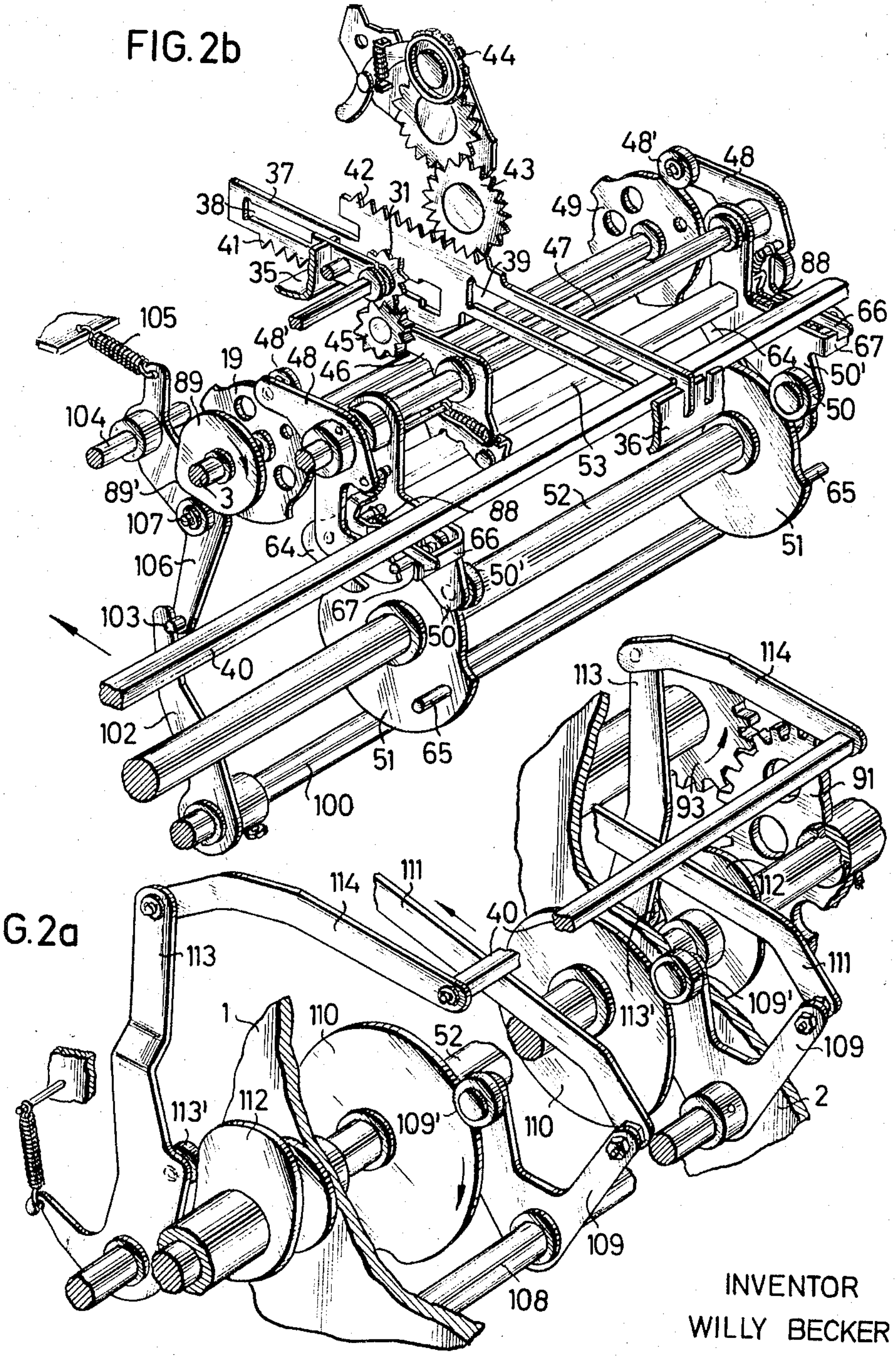

FIGS. 2*a*, 2*b*, 2*c* illustrates the control and drive means for the arrangement according to FIGS. 1*a*, 1*b*, 1*c*.

Figure 3A:
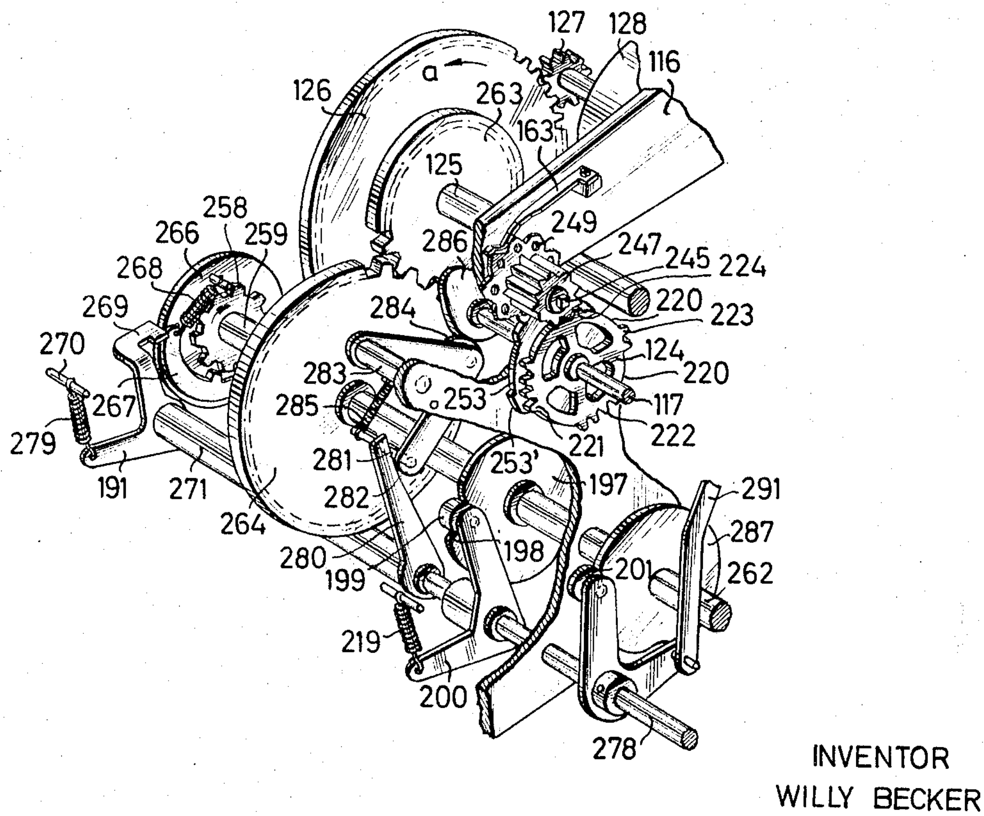
Figure 3B:
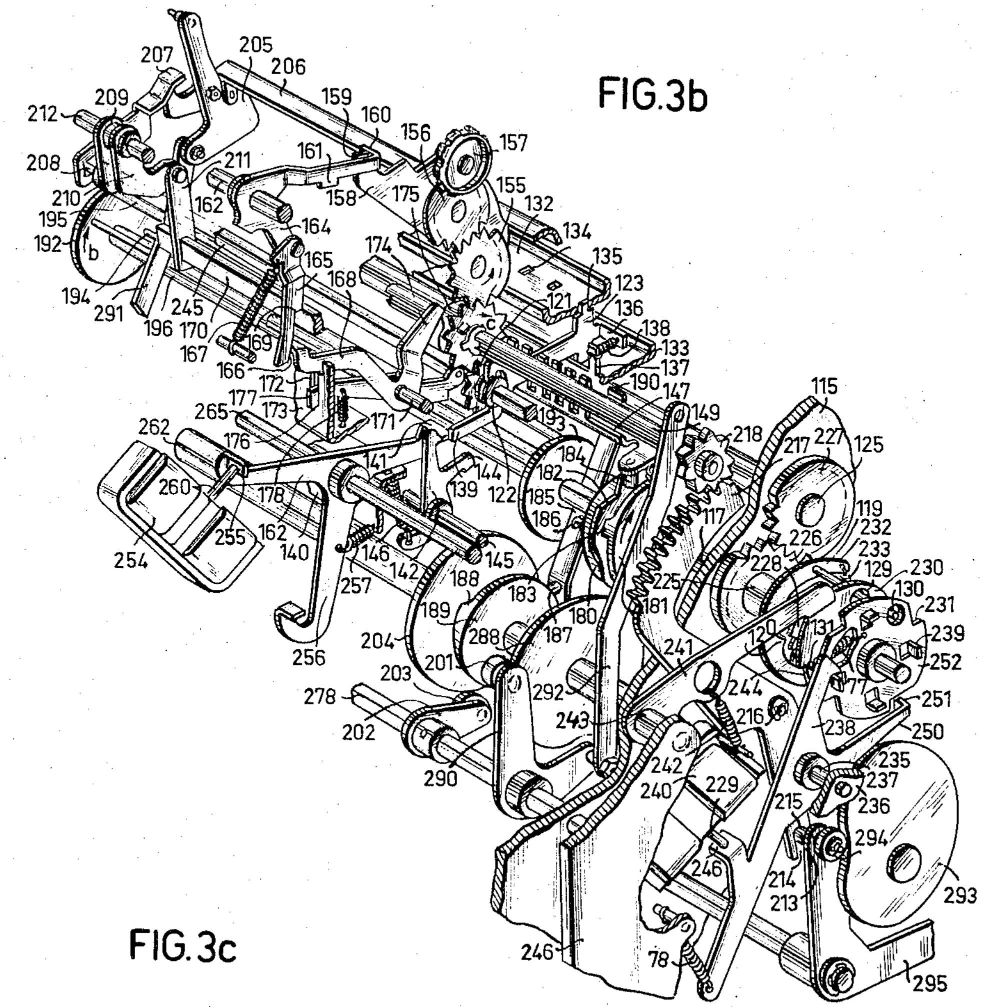
Figure 3C:
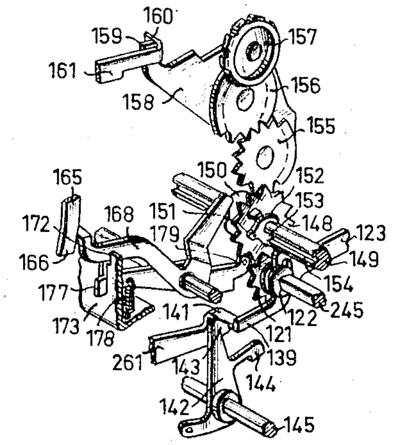

FIGS. 3*a*, 3*b*, 3*c* illustrate in isometric view another embodiment according to the present invention with a value converting device operating in conformity with a special code 4–4–2–1 and, more specifically:

FIG. 3*a* shows the left-hand drive portion of the device with a value converting transmission according to the present invention;

FIG. 3*b* illustrates that portion of the device which is located to the right of the portion shown in FIG. 3*a* and also illustrates the counting and printing mechanism for one digit;

FIG. 3*c* illustrates a part of the upper central portion of FIG. 3*b* to show more clearly the storing and printing members for one digit.

The device for electromechanically converting binary coded values into decimal values according to the present invention is characterized primarily by a decoding wheel common to all digits and provided with four groups of circumferential teeth, said decoding wheel being adapted to be rotated in conformity with the angle between the groups of teeth in a stepwise manner by a motor through the intervention of a clutch which may be made effective by electric impulses. According to a further feature of the present invention, the drive of the decoding wheel is adapted to adjust a member storing the decimal value of a digit through the intervention of coupling or clutch means pertaining to the respective digit.

According to another feature of the present invention, the special code has the values or weights 4–4–2–1, and this special code is taken from the customary code 8–4–2–1 by replacing the value "8" by the value "4" and by suppressing the clearance following the input of this value whereby with the feeding of the first "4" automatically also the second "4" will be fed into the device. This is possible since with the code 8–4–2–1 the first and second weight or value are never fed together but either the first or the second. Consequently, the decoding wheel is provided with two groups of four teeth each, one group having two teeth, and one group having one tooth only. Furthermore, the counting mechanism comprises members which upon occurrence of a binary "8" will make the coupling or clutch means mentioned above effective in the coupled position through the intervention of the two groups of teeth comprising four teeth each.

The decoding device according to the present invention cooperates with a printing mechanism. The binary values fed into the value converting device, following the conversion into decimal values, are printed in all digits simultaneously or approximately simultaneously on a paper tape, a form, or the like.

The arrangement according to FIGS. 1*a*, 1*b*, 1*c* and 2*a*, 2*b* and 2*c* is adapted for a code the four binary digits of which have the values $2^0$, $2^1$, $2^2$ and $2^3$, i.e. 1, 2, 4 and 8. With this customarily employed code, the decimal values 0 to 9 correspond to the binary values $2^0$, $2^1$, $2^2$, $2^3$ in conformity with the following Table A, in which 0 means no current or no impulse and in which L means current or impulse.

TABLE A

| Decimal | 0 | 1 | 2 | 3 | 4 | 5 | 6 | 7 | 8 | 9 |
|---|---|---|---|---|---|---|---|---|---|---|
| Binary: | | | | | | | | | | |
| $2^3$ | 0 | 0 | 0 | 0 | 0 | 0 | 0 | 0 | L | L |
| $2^2$ | 0 | 0 | 0 | 0 | L | L | L | L | 0 | 0 |
| $2^1$ | 0 | 0 | L | L | 0 | 0 | L | L | 0 | 0 |
| $2^0$ | 0 | L | 0 | L | 0 | L | 0 | L | 0 | L |

It is, however, to be understood that also other known codes, for instance the code 2–4–2–1 could be employed.

The arrangement according to FIGS. 3*a* to 3*c* is based on a special code the structure of which will become apparent from the following comparison with the ordinarily employed code.

TABLE B

| Decimal | 0 | 1 | 2 | 3 | 4 | 5 | 6 | 7 | 8 | 9 | , | . |
|---|---|---|---|---|---|---|---|---|---|---|---|---|
| Binary: | | | | | | | | | | | | |
| $2^3$ | 0 | 0 | 0 | 0 | 0 | 0 | 0 | 0 | L | L | | |
| $2^2$ | 0 | 0 | 0 | 0 | L | L | L | L | 0 | 0 | | |
| $2^1$ | 0 | 0 | L | L | 0 | 0 | L | L | 0 | 0 | | |
| $2^0$ | 0 | L | 0 | L | 0 | L | 0 | L | 0 | L | | |
| Special: | | | | | | | | | | | | |
| $2^2$ | 0 | 0 | 0 | 0 | 0 | 0 | 0 | 0 | L | L | L | L |
| $2^2$ | 0 | 0 | 0 | 0 | L | L | L | L | L | L | L | L |
| $2^1$ | 0 | 0 | L | L | 0 | 0 | L | L | 0 | 0 | L | L |
| $2^0$ | 0 | L | 0 | L | 0 | L | 0 | L | 0 | L | 0 | L |

As was the case with the example in Table A, it is assumed that the individual binary values are fed into the device for all decimal digits simultaneously but within the individual binary bits in series. It is, however, to be understood that this type of decoding is not limited to the particular sequence of steps described. In contrast to the arrangement of FIGS. 1*a*, 1*b*, 1*c* and 2*a*, 2*b*, 2*c* (Table A), with the ararngement according to FIGS. 3*a*, 3*b*, 3*c* (Table B), the binary values are not fed into the arrangement in the sequence $2^0$–$2^1$–$2^2$–$2^3$, i.e. in the sequence 1–2–4–8, but starting with the highest partial values, in the sequence $2^3$–$2^2$–$2^1$–$2^0$, i.e. 8–4–2–1. When employing this special sequence and the above mentioned special code, a minimum of structural elements will suffice, with two times four steps at the beginning of the sequence of working steps and with suppressed clearing following the first four steps.

Referring now to the drawings in detail, and FIGS. 1*a*, 1*b* and 1*c* thereof in particular, the arrangement shown therein comprises a shaft 3 journalled in two walls of the machine frame designated with the reference numerals 1 (FIG. 1*a*) and 2 (FIG. 1*b*). Shaft 3 has connected thereto a decoding wheel 4 which is provided with four groups of circumferential teeth 4*a*, 4*b*, 4*c* and 4*d* which are distributed over the circumference of the wheel and which are separated by spaces 5 having no teeth. The number of teeth of the above mentioned groups of teeth 4*a* to 4*d* corresponds to the selected code. In the device shown in FIG. 1*a*, group 4*a* has one tooth, group 4*b* has two teeth, group 4*c* has four teeth and group 4*d* has eight teeth.

Shaft 3 has furthermore rotatably journalled thereon a drive 6 which is preferably made in one piece and comprises a drive pinion 7 adjacent wall 1, which meshes with a gear 9 driven by an electromotor (not shown). The other end of drive 6 is provided with a follower gear or claw wheel 8. During the operation of the device, drive 6 rotates in the direction indicated by the arrow A.

Shaft 3 has furthermore fixedly connected thereto a clutch output wheel 10 which has tiltably journalled thereon a clutch follower latch 12. Latch 12 is held in coupling engagement with claw wheel 8 by means of a spring 79 and is adapted to be brought into or out of engagement by a clutch control disc 11 journalled on shaft 3, through the intervention of a pin 14 in latch 12. The movement of clutch control disc 11 by output wheel 10 is assured by a follower pin 13 connected to output wheel 10, said pin extending into an opening of control disc 11. For purposes of controlling pin 14 or latch 12 respectively, a passage 11*a* of control disc 11 through which extends pin 14 is provided with an inclined edge 15 by means of which the latch 12 may be tilted into disengaging position when control disc 11 is held stationary and claw wheel 8 is rotated.

The control of the above mentioned clutch 8, 10, 11, 12 is effected by means of a control armature 18 which is tiltably journalled on a bolt 17 mounted in a frame wall 16. In disengaged or uncoupled position, armature 18 holds an extension 26 of control disc 11 by means of a hook-shaped arm 25. For purposes of making the clutch 8, 10, 11, 12 effective, armature 18 is adapted to be tilted against the thrust of a spring 78 by means of a push rod 19 acting on an extension 76 of armature 18, said pushrod 19 being adapted to be actuated by an electromagnet 20. In order to prevent the clutch output wheel 10 in the resting position of clutch 8, 10, 11, 12 from rotating backwards and also shaft 3, an arresting arm 21 is tiltably journalled on a bolt 23 inserted into frame wall 16. Arm 21 is pulled in a direction toward output wheel 10 by a spring 22. Output wheel 10 is provided with four arresting steps 24 which are equally distributed over the circumference of output wheel 10. The arrangement comprising the elements 8 to 26 as described above forms a so-called "quarter revolution clutch."

As shown in FIG. 1*a*, armature 18 is provided with a further arm 80 the end of which forms a hook 81 which cooperates with curved engaging surfaces 82 of control disc 11. A spring 77 is interposed between control disc 11 and output wheel 10, said spring serving for rotating the control disc 11 in clockwise direction upon release of extension 26 by arm 25. Arresting arm 21 will prevent output wheel 10 from rotating in counterclockwise direction. In view of the rotation of disc 11, the inclined edge 15 will release pin 14 and thereby latch 12 so that clutch or coupling 8, 10, 11, 12 will be engaged. Shortly after the output wheel starts rotating, by the curved flank of engaging surfaces 82, hook 81 and thereby armature 18 through the intervention of arm 80 will be tilted into arresting position after electromagnet 20 has become deenergized. Arm or arresting latch 25 will move into the path of movement of one of the extensions 26 and will stop the output side of the clutch comprising the elements 10, 3. In view of the momentum gained during their movement, shaft 3 and output wheel 10 will rotate further until arresting arm 21 upon tensioning of spring 77 will engage the next arresting step 24 of output wheel 10, and pin 14 will slide along edge 15 of clutch control disc 11 until latch 12 will completely disengage claw wheel 8. After clutch 8, 10, 11, 12 has been engaged and stopped four times, shaft 3 and decoding wheel 4 have executed one complete revolution.

A pinion 28 fixedly mounted on a shaft 27 of square cross section extends into the range of movement of the teeth or groups of teeth 4*a* to 4*d* of decoding wheel 4. Shaft 27 which is journalled in machine frame walls 1 and 2 has furthermore fixedly connected thereto a brake disc 29 which cooperates with an arresting disc 30 fixedly mounted on shaft 3 adjacent decoding wheel 4 in such a way that after the respective group of teeth 4*a* to 4*d* has moved out of engagement with pinion 28, shaft 27 will stop immediately. Shaft 27 is furthermore provided in each output or especially in each printing position with a gear 31 (FIG. 1*b*) which is guided in a groove 32 by a fork-shaped arm 33. In a comb-shaped rail 35 fixedly mounted between the frame walls 1, 2 the arms 33 of the individual digits are laterally non-displaceably held. For reasons of convenience, in FIG. 1*b* the devices for coupling and advancing for only one digit have been shown. In comb-shaped rail 35 and in further comb-shaped guiding member 36 which is likewise fixedly arranged between the frame walls 1, 2 there are displaceably arranged racks 37. Also in this instance, for reasons of convenience, only one rack 37 has been shown the movement of which is limited in horizontal direction by a recess 38 and in vertical direction by a shaft 34. Through a further recess 39 of gear racks 37 there extends a collecting or returning bar 40 by means of which the racks 37 are returned in a manner known per se from their working position to their respective starting position. Gear racks 37 have their bottom side provided with teeth 41 by means of which values are fed into the racks 37 serving as storing members. The top side of racks 37 is likewise provided with teeth which are designated with the reference numeral 42. Teeth 42 are in meshing engagement with a gear 43 which serves for adjusting a printing type wheel 44.

The input of values into the racks 37 is effected through the intervention of the clutch pinions 45. For each digit there is provided such pinion 45 which is rotatably journalled on a control lever 46 which in turn is tiltable and guided in comb-shaped rail 35. The axial width of pinion 45 is such that it meshes with gear 31 as well as with the teeth 41 of rack 37 if pinion 45 is in coupled position. The pinions 45 are engaged by arresting levers 85 which are tiltably journalled on a stationary shaft 86 and which are brought into arresting engagement with pinions 45 by springs 87. Control levers 46 are pivotally journalled on a shaft 47 while shaft 47 is in turn rotatably journalled in machine frame walls 1, 2.

Shaft 47 has fixedly connected thereto two roller levers 48 which are provided with rollers 48' engaging two control discs 49 provided with recessed curved sections 83, said discs 49 being fixedly connected to shaft 3. Shaft 47 has furthermore tiltably mounted thereon two roller arms 50 which are provided with rollers 50' adapted to be engaged by the protruding curved section of control discs 51 mounted on a shaft 52. Details of the structure and operation of shaft 52 will be described later in connection with FIGS. 2*a*, 2*b*. The roller arms 50 are interconnected by means of a control bar 53 which cooperates with one arresting latch 54 each for each digit, which latch 54 is tiltably journalled on the respective control lever 46. The rearwardly directed lateral extensions of latches 54 are engaged by springs 56 the other ends of which are fixedly connected to a crossbar 55 held in roller arms 50. In the rest position of the latches 54 shown in the drawings, one abutment 57 each rests against a comb-shaped strip 58 interconnecting the frame walls 1, 2.

Each of the two roller levers 48 is adapted to be coupled to the adjacent roller arm 50 by means of levers 64. Each lever 64 is tiltably journalled on a bolt 62 mounted on roller lever 48 and is subjected to the force of a spring 63 interposed between lever 64 and roller lever 48. Lever 64 straddles with a nose portion 66 a bent-off extension 67 of roller arm 50. Lever 64 cooperates with a pin 65 which is inserted laterally in control disc 51 and which lifts the nose portion 66 out of engagement with extension 67 during a revolution of shaft 52. A spring 88 is provided between bolt 62 of roller lever 48 and a bolt 68 of roller arm 50, said bolt 68 serving as stop for lever 64. Spring 88 serves for returning the uncoupled roller levers 48 or roller arms 50 to their respective coupled position.

The control levers 46 carrying the pinions 45 have one arm thereof provided with an extension 59 which is adapted to be arrested by a nose portion 60 of an actuating lever 61 or 61' in the uncoupled position. Actuating levers 61, 61' are journalled on a stationary shaft 75 and are provided with extensions 69, 69' and 74, 74' by means of which the actuating levers 61, 61' may be tilted through the intervention of pushrods 70, 70' against the thrust of springs 71 engaging arms 72 of levers 61, 61' and connected to comb-shaped guiding member 36. The pushrods 70, 70' are actuated by electromagnets 73 which are arranged at right angles with regard to each other for purposes of obtaining a narrow width for the individual digits. More specifically, with regard to FIG. 1*b*, the levers 61 pertaining to the odd digits are actuated through the intervention of the pushrods 70 engaging the extensions 69 while the levers 61' pertaining to the even digits are actuated by means of the pushrods 70' engaging the extensions 74'.

As has already been mentioned above, the input of a decimal value is effected by impulses introduced in series and having different values. Electromagnet 73 remains de-energized if a binary "0" is fed into the arrangement. If, however, a binary "LL" is fed into the arrangement, magnet 73 is energized for a short period of time. The time at which the impulse or impulses is or are introduced during a revolution of the shaft 3 or the decoding wheel 4 determines the value of the respective binary "L." Following each energization of electromagnet 73, also the electromagnet 20 actuating the clutch 8, 10, 11, 12 (FIG. 1*a*) is energized for a short period of time.

Whereas in FIG. 1*b* control lever 46 of the digit represented in this figure is shown in coupled position, FIG. 1*c* illustrates the value converting and storing members of a digit in the position in which the pinion 45 is uncoupled. FIG. 1*c* will be described in detail in connection with the description of the operation of the arrangement according to the invention. The devices for controlling the various steps of operation which have been omitted in FIGS. 1*a* to 1*c* in order to show the remaining parts of the device more clearly, are illustrated in detail in FIGS. 2*a* to 2*c*.

With reference of FIG. 2*c*, a drive 90 is rotatably journalled on shaft 52, which drive is provided at one end with a gear 91 (FIG. 2*a*) and at the other end with a claw wheel 92 (FIG. 2*c*). Gear 91 meshes with a gear 93 which is together with the drive wheel 9 shown in FIG. 1*a* driven by an electromotor in the direction of the arrow B indicated in FIG. 2*a*. Shaft 52 has fixedly connected thereto a clutch disc 96 at that end thereof which protrudes beyond claw wheel 92 (FIG. 2*c*). A follower latch 94 is tiltably journalled on a bearing bolt 95 of disc 96. Latch 94 is tilted into coupled position by means of a spring 97 and is held in uncoupled position by an extension 98 of a lever 99 which is fixedly mounted on a shaft 100. A spring 101 retains lever 99 in uncoupled position. Shaft 100 (FIG. 2*b*) has connected thereto a lever arm 102 the end of which rests against a pin 103 of a roller lever 106. Roller lever 106 is tiltably journalled on a shaft 104 and is provided with a lateral roller 107 which rests against a cam disc 89 fixedly mounted on shaft 3 through a spring 105.

A shaft 108 rotatably journalled in walls 1, 2 (FIG. 2*a*) has fixedly mounted thereon two roller levers 109 which are provided with rollers 109' resting against cam disc 110 on shaft 52. Each roller lever 109 has pivotally connected thereto a pushrod 111 through the intervention of which the printing mechanism is released in a manner shown in FIGS. 3*b* and 3*c* and known per se. Shaft 52 has furthermore fixedly mounted thereon two cam discs 112 which are engaged by rollers 113' of two roller levers 113. Roller levers 113 are connected to collecting and returning bar 40 by means of links 114.

*Operation of the decoding device*

For purposes of explaining the operation of the decoding device illustrated in FIGS. 1*a* to 1*c* and 2*a* to 2*c*, it may be assumed that type wheel 44 (FIG. 1*b*) is supposed to be adjusted for the decimal value 5. Decimal value "5" is represented by the binary information "L 0 L 0" on the basis of the direction of rotation indicated in FIG. 1*b*, i.e. value "1" plus value "4." Accordingly, immediately upon start, actuating lever 61 is actuated by pushrod 70 and a starting impulse is imparted upon magnet 20 (FIG. 1*a*). This impulse will actuate clutch 8, 10, 11, 12 whereupon shaft 3 will carry out a partial revolution.

At the beginning of a revolution of shaft 3, roller levers 48 (FIG. 1*b*) and the adjacent roller arms 50 are interengaged through the intervention of levers 64, nose portions 66 and extensions 67. After shaft 3 has been rotated to such an extent that the rollers 48′ of roller levers 48 may engage the recessed curved portion 83 of control disc 49, roller levers 48 are tilted in counterclockwise direction and thereby take along the roller arms 50 through the intervention of extending portions 84 resting against bolts 68. Clutch control bar 53 is displaced toward the front and thereby rotates control lever 46 likewise in counterclockwise direction so that pinion 45 is lowered and brought out of engagement with the teeth 41 of rack 37 and gear 31. During this movement, the latch 54 abuts with its extension 57 against the comb-shaped strip 58 and is tilted against the thrust of spring 56 so that bar 53 is freed. Simultaneously, nose portion 60 of actuating lever 61 has grasped the extension 59 whereby control lever 46 would normally be held in the tilted position according to FIG. 1*c*. However, since in view of the binary "L" an impulse was imparted upon the electromagnet for actuating pushrod 70 (FIG. 1*b*) which will tilt the actuating lever 61, nose portion 60 cannot retain extension 59. Upon further revolution of shaft 3 during which the rollers 48′ of roller levers 48 are lifted again out of the recess curved portions 83 of control discs 49, the arrested roller arms 50 and bar 53 will return to their respective starting position. In this way pinion 45 will be returned to meshing engagement with gear 31 and teeth 41 of rack 37. Simultaneously the abutment 57 will be freed and the latch 54 will engage and arrest the returning bar 53.

During the course of the revolution of shaft 3, arresting disc 30 (FIG. 1*a*) will release brake disc 29 of shaft 27, and the one tooth of the first group of teeth **4*a* of decoding wheel 4 will mesh with pinion 28 and will displace gear rack 37 serving as storing member by one step through the intervention of shaft 27, gear 31, pinion 45 and teeth 41. Simultaneously, the type wheel 44 will be rotated by one unit through the intervention of the teeth 42 and the gears 43. Following this one step, arresting disc 30** (FIG. 1*a*) will again arrest brake disc 29 and will stop the entire system immediately so as to prevent any idling movement.

According to the above selected example for purposes of explanation, in the following digit of the code number the binary value 0 is put into the machine. In contrast to the just described course of operation, control lever 46 (FIG. 1*b*) the extension 59 of which has been grasped by the nose portion 60 of actuating lever 61 when bar 53 is tilted toward the front, will now not be released when bar 53 will be returned to its starting position. This is caused by the above mentioned actuating lever 61 which is not tilted by pushrod 70. Nevertheless, magnet 20 (FIG. 1*a*) will also in this instance receive an actuating impulse so that the clutch 8, 10, 11, 12 starts rotating. The two teeth of the group of teeth **4*b* of decoding wheel 4 will rotate pinion 28 and thereby rotate shaft 27 and gear 31** (FIG. 1*b*) by a distance corresponding to two teeth. Since during this rotation pinion 45 is tilted out of meshing engagement with gear 31 and teeth 41 of rack 37, the rotating movement is not imparted upon rack 37. This position of arresting lever 61, control lever 46, pinion 45 and of arresting latch 54 is shown in FIG. 1*c*.

The following binary value corresponding to the decimal value "4" which is fed into the decoding device is again an "L." Upon actuation of clutch 8, 10, 11, 12 and of actuating lever 61, decoding wheel 4 cares out the third partial rotation during which the group of teeth **4*c* with its four teeth will mesh with pinion 28. Gear rack 37 and type wheel 44 will thereby be advanced by four steps since pinion 45** is in operative position.

During the last partial revolution of shaft 3, no input of a value is effected since the actuating lever 61 will not be actuated by pushrod 70 in view of the fact that no calculating impulse is imparted upon magnet 73, although the impulse will cause the clutch 8, 10, 11, 12 to be actuated by electromagnet 20. Control lever 46 and pinion 45 will, therefore, remain in uncoupled position during the meshing engagement of the group of teeth **4*d* with gear 28**.

Following the completion of the fourth partial revolution of shaft 3, the control and cam discs 11, 30, 89, 49 connected to shaft 3 will again occupy the starting position illustrated in FIGS. 1*a* and 1*b*. In conformity with the fed-in binary information "L 0 L 0" rack 37 (FIG. 1*b*) and type wheel 44 have been rotated by five steps, i.e. have been turned to "5." Thus, the binary value "L 0 L 0" has been converted into a decimal value and can be printed as such.

As will be evident from FIG. 2*b*, the curved surface of cam disc 89 has the last quarter thereof provided with a cam elevation 89′. This elevation 89′ will bring about that upon start of the last portion of the revolution of shaft 3 lever 106 will be tilted in clockwise direction. This tilting movement will through the intervention of pin 103 be transmitted to shaft 100 which will, therefore, be tilted in counterclockwise direction and will release latch 94 by means of lever 99 (FIG. 2*c*) or, more specifically, the extension 98 thereof. In this way shaft 52 will be coupled to drive 90 and will thereby be rotated in clockwise direction. Consequently, first the cam discs 110 will tilt the roller levers 109 and the latter will release through the intervention of the pushrods 111 the printing hammers of the printing mechanism in a manner not shown in the drawing. Immediately upon completion of the fourth partial revolution of shaft 3, the decimal values stored in series in the gears 37 or type wheels 44 may be printed simultaneously in all digits.

During rotation of shaft 52 on one hand the levers 64 are lifted by the pins 65 of cam discs 51 to such an extent that the nose portions 66 will release the extensions 67. On the other hand, the roller arms 50 and thereby the bar 53 will be tilted forwardly by the cam discs 51 which will engage the rollers 50′ with their protruding portion. Bar 53, however, will tilt the control lever 46 in counterclockwise direction so that pinion 45 will be lowered and brought out of meshing engagement with gears 31 and teeth 41 of racks 37. In this way, racks 37 may be returned from their working position to their rest or starting position in an unimpeded manner. The return of the racks 37 is effected by the collecting or returning bar 40. For this purpose the roller levers 113 are rotated in counterclockwise direction by cam discs 112 mounted on shaft 52. This movement is transmitted to bar 40 through the intervention of pullrods 114. Bar 40 will during its movement in the direction of the arrow C shown in FIG. 2*b* return all racks 37 into the starting or rest position shown in FIGS. 1*b*, 1*c* and 2*b*. Upon a complete revolution of shaft 52, shaft 100 (FIG. 2*b*) and lever 99 (FIG. 2*c*) will be returned to the respective starting position by spring 101 engaging lever 99 since cam disc 89 will again release roller lever 106 and thereby lever 102 during the rotation of shaft 3. By means of extension 98 (FIG. 2*c*), latch 94 will be made ineffective and shaft 52 will be stopped in its rest position. Therefore, all parts of the decoding device according to the present invention will occupy their respective starting or rest position.

*Embodiment of FIGS. 3a, 3b, 3c*

The value converting device shown in FIGS. 3*a* to 3*c* operates in conformity with the special code 4–4–2–1 mentioned in the introductory portion of the specification. As has likewise been mentioned above and especially with reference to Tables A and B, this decoding method will not only have an adjusting field for the digits 0 to 9 but a further adjusting field for a decimal point and one for a comma. As will be evident from Table B, the decimal value "8" may be formed by the partial values "4" plus "4," the decimal value "9" by the partial values "4" plus "4" plus "1." The structural details for converting the customary code 8–4–2–1 into the special code 4–4–2–1 will become evident from the following description of FIGS. 3*a* to 3*c* and the description of the operation of the device.

Accordings to FIGS. 3*a* and 3*b*, in two frame walls 115 (FIG. 3*b*), 116 (FIG. 3*a*) there is journalled a shaft 117 which has mounted thereon a decoding wheel 124. Decoding wheel 124 is provided with four groups of teeth 221 to 224 distributed over its circumference, said teeth being interrupted by gaps indicated by the reference numeral 220. Groups 221 and 222 have four teeth each, group 223 has two teeth, and group 224 has one tooth. Thus, the number of teeth corresponds to the special code 4–4–2–1.

A hollow drive 225 is journalled on shaft 117 outside frame wall 115 (FIG. 3*b*) so as to be loosely rotatable thereon. Hollow drive 225 comprises a drive pinion 226 meshing with a gear 227. Gear 227 is fixedly mounted on a shaft 125 which is likewise rotatably mounted in frame walls 115, 116. Shaft 125 has that end thereof which protrudes beyond frame wall 116 (FIG. 3*a*) equipped with a drive wheel 126 by means of which shaft 125 is adapted to be rotated in the direction of the arrow *a* through the intervention of a pinion 127 and a motor 128 only a portion of which is shown in FIG. 3*a*.

Hollow drive 225 comprises a claw wheel 228 which forms part of a control clutch 230, 231, 232 which is similar to the control clutch described in connection with FIG. 1*a*. The control clutch is designed as quarter revolution clutch. It is to be understood, however, that the angles of the individual partial revolutions are not uniform (90°) but they differ from each other as will be described in detail further below.

Claw wheel 228 has arranged adjacent thereto a clutch output wheel 230 on shaft 117. Wheel 230 has pivotally connected thereto a clutch follower latch 232 which is rotatable about a bearing pin not shown in the drawing. Latch 232 or a coupling tooth 120 is drawn into engagement with clutch wheel 228 by means of a spring 233. Latch 232 has connected thereto a pin 119 which penetrates into a bore 129 of output wheel or disc 230 and which ends in an eccentrically arranged approximately circular cutout 130 of clutch control disc 231. Latch 232 will be tilted in one or the other direction by the bore 129 or clutch control disc 231 respectively through the intervention of pin 119. A spring 234 is interposed between clutch control disc 231 and a pin 131 laterally protruding from clutch output wheel 230. Spring 234 will assure that control disc 231 is taken along by output wheel 230 loosely but non-positively.

The engagement and disengagement of the above described clutch 228, 230, 231, 232 is effected by a control armature 238 which is tiltably journalled on a bolt 237 which in turn is fixedly connected to a wall 236. In disengaged position of the clutch, control armature 238 retains control disc 231 by extensions 239 protruding therefrom, said armature 238 being provided with a hook-shaped arm 235 forming a latch and engaging the extensions 239. For purposes of disengaging clutch 228, 231, 232, control armature 238 is adapted to be tilted against the thrust of a spring 248 by a pushrod 229 of an electromagnet 240 which may be energized by impulses. The disengagement is brought about by the pushrod 229 acting upon an extension 246 of control armature 238 so as to release extension 246.

In order to prevent in the rest position of clutch 228, 230, 231, 232 the output wheel 230 and thereby shaft 117 from rotating in opposite direction, an arresting arm 241 is rotatably journalled on a bolt 243 fixedly held in wall 236. Arm 241 is pulled against steps 244 of output wheel 230 by a spring 242. Output wheel 230 has four such steps 244 distributed over its circumference at a distance or angle corresponding to the distance or angle between the groups of teeth 221 to 224, as for instance approximately two times 105°, once 80°, once 70°. As will be seen from FIG. 3*b*, steps 244 have a definite relationship to the arrangement of the extensions 239 and thereby to the rest position of clutch control disc 231 or, more specifically, the cutout 130 thereof.

As has already been mentioned above, the disengagement of clutch 228, 230, 231, 232 is effected by means of the armature 238, the arm 235, the extensions 239, the cutout 130 serving as control edge and preferably being circular, and control pin 119. In contrast thereto, for purposes of returning control armature 238 into arresting position, there is provided an extension 251 of an arm 250 at control armature 238. Extension 251 cooperates with cam surfaces 252 on the circumference of clutch control disc 231. The cam surfaces 252 will return control armature 238 into its arresting position in a positive manner shortly after the clutch or, more specifically, the clutch control disc 231 starts rotating. Control armature 238 remains in this position until electromagnet 240 has again been energized by an impulse. Arm 235 grasps the extension 239 following next in the direction of rotation, and the coupling tooth 120 of latch 232 will be disengaged from claw wheel 228. A rotation of the output side 230, 231 of the clutch as well as of shaft 117 in opposite direction will be prevented by arresting arm 241. For each value converting operation, magnet 240 will be energized four times and thus the clutch will be disengaged four times. Accordingly, shaft 117 and decoding wheel 124 will carry out one complete revolution in four steps of for instance 105°, 105°, 80° and 70°.

A pinion 247 mounted on a shaft 245 of square cross section extends into the range of rotational movement of the teeth 221 to 224 of decoding wheel 124. Shaft 245 has adjacent pinion 247 mounted thereon a brake disc 249 which cooperates with an arresting disc 253 fixedly mounted on shaft 117 adjacent decoding wheel 124, the cooperation being in a manner known per se such that after the last tooth of the respective group of teeth 221 to 224 has moved out of engagement with pinion 247, shaft 245 is stopped immediately and will not rotate any further. In the rest position pinion 247 and shaft 245 are non-rotatably held by a protrusion 253′ of arresting disc 253 extending into the brake disc 249 while pinion 247 and shaft 245 will be held without play by a leaf spring 163 connected to wall 116. Decoding wheel 124 is, with regard to the protrusions 253′ of arresting disc 253 arranged at such an angle that in the rest position the last tooth of the respective group of teeth 221 to 224 is held in engagement with the tooth of pinion 247 so that pinion 247 cannot move in either of the two directions of rotation.

For each computing or value output digit one clutch gear 121 each is provided on shaft 245 (FIG. 3*b*), said gear 121 being provided with a guiding ring 122 having a groove into which extends an arm 123. The arms 123 pertaining to the various gears 121 are rotatably journalled in stationary plates 132, 133 or in cutouts 134 of the same by means of studs 135 so as to be rotatable to a limited extent. Each arm 123 is provided with an extension 136 which is connected with one extension 137 each of a lower bearing plate 133 by means of a tension spring 138. The front ends of the arms 123 extending into the grooves of the guiding rings 122 of gear 121 are provided with a protruding abutment 139 by means of which the respective gear 121 is displaceable in axial direction.

The control of the above mentioned coupling means 121, 122, 123, 139 is effected, in a manner similar to that described in connection with FIGS. 1*a*, 1*b*, 1*c* and 2a, 2b, 2c, by an electromagnet 254 for each of the digits. Each electromagnet 254 of alternate digits acts upon an extension 255 through the intervention of a pushrod 260 and thereby rotates a release lever 261 against the thrust of a spring 257 engaging an arm 256. Similarly, each electromagnet 254 of the intermediate digits acts upon an extension of an arm 256 which is offset with regard to extension 255 and thereby again will rotate release lever 261 against the thrust of a spring 257 of the respective digit. Springs 257 have those ends thereof which are remote from the arms 256 connected to an angle rail 140 extending through the machine. Release levers 261 which are tiltably journalled on a shaft 265 stationarily held in the frame walls of the machine are provided with one extension 141 each within the range of movement of the abutments 139. One storage lever 142 each cooperates with the extensions 141. Lever 142 is shown more clearly in FIG. 3c and is provided with a latch 143 extending toward extension 141 and is also provided with an extension 144 extending approximately at right angles with regard to latch 143. Storing levers 142 are rotatably journalled on a shaft 145 (FIG. 3b) extending through the machine and are pressed against the extensions 141 by one spring 146 each which has the other end connected to angle rail 140. As will be evident from FIGS. 3b and 3c, in the rest position the extension 139 of clutch control arm 123 will rest against the extension 141 under the bias of spring 138. Similarly, latch 143 of storing lever 142 will be brought into engagement with abutment 139 by spring 146.

The arms 123 which are tiltable by means of studs 135 in cutouts of the bearing plates 132, 133 are adapted to be actuated by a comb-shaped rail 147 supporting the arms 123, in addition to being adapted to be actuated by the above mentioned extensions 141 of release levers 261.

As has been mentioned already in the introductory portion of the specification, the input of a decimal value is effected by impulses fed into the device in series and having different magnitudes. Electromagnet 254 remains de-energized if a binary "0" is fed-in, however, in case of a binary "L," magnet 254 is energized for a short period of time so that release lever 261 is rotated in clockwise direction whereby extension 141 is lowered to such an extent that latch 143 may arrest latch 141. Thus, the impulse is stored in the device. The instant at which an impulse or a sequence of impulses during a revolution of shaft 117 or the decoding wheel 124 is fed into the device determines the value of the respective fed-in binary "L." In the first partial rotation, the value is "4," in the second likewise "4," in the third the value is "2," and in the fourth it is "1." In synchronism with the input of the impulses into magnet 254, the disengagement of clutch 228, 230, 231, 232 is effected by electromagnet 240 in the manner described above.

In order to add up and store the decimal values composed of the binary partial values of different weight, each digit has associated therewith a storing gear 148 (FIG. 3c) which is rotatably journalled on a shaft 149 and which has for instance at least twelve teeth. Storing gear 148 has one end face thereof provided with an extension 150 which extends into the range of movement of an abutment 151 of a clearing member 152. Each of these clearing members 152 which is associated with the respective storing gear 148 of the respective digit is equipped with an inwardly directed follower 153 which extends into a longitudinal groove 154 of shaft 149. Each storing gear 148 of each digit meshes with an intermediate gear 155 which serves for adjusting a printing type wheel 157 by means of a further gear 156. Gears 155, 156 as well as printing type wheel 157 are rotatably journalled on a printing hammer plate 158.

Printing hammer plate 158 is provided with a nose 159 which is engaged by a pin 160 of a printing release lever 161 in the starting position of the printing mechanism. Levers 161 are rotatably journalled on a common shaft 162. One arm 164 of said levers 161 has pivotally connected thereto a pushrod 165 which rests against a switch lever 168 by means of an edge 166 under the influence of a spring 167 engaging pushrod 165. Pushrod 165 is furthermore provided with a step 169 by means of which pushrod 165 is adapted to be lifted by a printing release bar 170.

Switch lever 168 (FIG. 3b) is rotatably journalled on a stationary shaft 171 and is prevented from moving laterally by an angle rail 173 provided with a guiding edge 172. Within the range of movement of storing gear 148, an arm 174 of switch lever 168 rests on a cam disc 175 fixedly connected with gear 148. In slots 176 of angle rail 173 (FIG. 3b) there are guided arresting levers 177 which are likewise rotatably journalled on shaft 171 adjacent the switch levers 168.

A spring 178 (FIG. 3c) which is interposed between the arresting levers 177 and angle rail 173 will draw an arresting nose portion 179 of arresting lever 177 into engagement with a tooth of storing gear 148.

As has already been mentioned above, for controlling purposes, i.e. for the engagement and disengagement of the coupling wheels 121 (FIG. 3b), arms 123 are laterally displaceable by means of a comb-shaped rail 147. Rail 147 may be displaced on one hand by a pair of cam discs 180, 181 which is fixedly mounted on shaft 117 carrying decoding wheel 124. Comb-shaped rail 147 is for this purpose equipped with a roller 184 which is guided between curved surfaces 182, 183 of cam discs 180, 181. In conformity with the spacing of the groups of teeth 221 to 224 of decoding wheel 124 which are for instance spaced from each other by angles of 105°, 105°, 80° and 70°, the just mentioned curved surfaces 182, 183 comprise a section which makes possible the engagement of the coupling wheels 121 and also comprise a control section which brings about an axial disengaging movement of the coupling wheels 121 so as to become disengaged from the storing gears 148, said control section making it furthermore possible to withdraw abutment arm 139 laterally out of the range of movement of extension 141 at release lever 261.

Comb-shaped rail 147 is also adapted to be controlled by a further cam disc 189 into the path 188 of which extends a roller 187 of a lever 185 tiltable about a stud 186. Lever 185 extends through a cutout 190 of rail 147. Cam disc 189 is fixedly mounted on a shaft 262 which toward the end of the adjusting operation is rotated through the intervention of an output disc 266 (FIG. 3a) of a one-revolution clutch as was the case with the embodiment of FIGS. 1a to 1c. The one-revolution clutch is driven by motor 128 and pinion 127 through the intervention of gear 126 in a manner described in connection with the quarter revolution clutch 228, 230, 231, 232. Shaft 125 of gear 126 has fixedly mounted thereon a further gear 263 meshing with a gear 264 which forms a part of a hollow drive 259 which is also provided with a claw wheel 258. For purposes of coupling output disc 266 with claw wheel 258, disc 266 has tiltably journalled thereon a follower latch 267 which is held in coupled position by a spring 268. An extension 269 of a lever 270, on the other hand, will hold latch 267 in uncoupled position. Lever 270 is fixedly connected to a hollow shaft 271 which in turn is journalled on a shaft 278. A spring 279 engages an arm 191 of lever 270 and retains the latter and latch 267 in uncoupled or disengaged position.

Clutch 258, 267, 266 is through the intervention of lever 270 controlled by an arm 280 connected to hollow shaft 271. Arm 280 rests against a pin 281 of a roller lever 282 which is tiltably journalled on a stud 283 in wall 116. Lever 282 has journalled thereon a roller 284 which rests against a cam disc 286 under the bias of a spring 285 engaging roller lever 282. Cam disc 286 is fixedly mounted on shaft 117 driven by the quarter revolution clutch 228, 230, 231, 232.

As shown in FIG. 3*b*, shaft 117 has fixedly mounted thereon two discs 192, 193 between which extend clearing rods 194, 195, 196. During rotation of shaft 117 or discs 192, 193 in the direction of the arrow *b*, these clearing rods 194, 195, 196 cooperate with the extensions 144 of storing levers 142 in such a way that they will engage the extensions 144 from underneath upon a partial advancing revolution of shaft 117 and will rotate storing lever 142 against the thrust of spring 146 for a short period of time until the extensions 144 will slide off the respective clearing rod 194, 195, 196. The clearing rods are so arranged that toward the end of the first partial revolution of for instance 105°, none of these rods will be grasped whereas during a further partial revolution, for instance after 210°, 290° and approximately 350°, each of the rods 194 to 196 will be grasped.

The clearing rods 194 to 196 have in a manner similar to the extensions 239 of clutch 228, 230, 231, 232 a different angular spacing with regard to each other whereby it is possible to achieve a very low load on the teeth 221 to 224 of decoding wheel 124, i.e. as close as possible an adaptation of the load to the number of teeth on one hand and to the partial working operations to be carried out in the same working step on the other hand. In a manner similar to the arrangement of the extensions 239 at clutch control disc 231 or the arrangement of the rods 194 to 196 in discs 192, 193 also the curved surfaces 182, 183 on cam discs 180, 181 are arranged at different angular spacings with regard to each other. No curved surface for disengaging the device is provided on cam discs 180, 181 for the fourth partial revolution as well as for the first digit since the disengaging movement is effected by the clutch disc 189 or path 188 thereof and pin 187 which start to revolve already during the last partial working step through the intervention of lever 185 which extends into comb-shaped rail 147.

As may be seen from FIG. 3*a*, several cam discs are fixedly connected to shaft 262 driven by single revolution clutch 258, 267, 266. More specifically, there is provided a first so-called zero rest cam 197 the rest depression 198 of which determines the zero position if a roller bolt 199 of a lever 200 engages depression 198 under the bias of a spring 219. Lever 200 is loosely rotatably journalled on shaft 278. Two further cam discs 287 (FIG. 3*a*) and 288 (FIG. 3*b*) are fixedly mounted on shaft 262 between frame walls 115, 116, said cam discs being of the same shape and design and provided in duplicate for a uniform control or switching operation. Cam discs 287, 288 are engaged by rollers 201 respectively pertaining to roller levers 289, 290 fixedly mounted on shaft 278. For purposes of positively actuating shaft 278, the latter has fixedly mounted thereon a further roller lever 202 (FIG. 3*b*) between roller levers 289 and 290. Roller lever 202 is equipped with a roller 203 which rests against a cam disc 204 fixedly arranged on shaft 262 between cam discs 287 and 288 and designed as counter cam disc with regard to cam discs 287, 288.

Roller levers 289, 290 have pivotally connected thereto pushrods 291, 292 (FIG. 3*b*) which on one hand act upon a printing hammer collecting and releasing rail 206 through the intervention of tilting arms 205 (only one being shown in FIG. 3*b*) and on the other hand on bar 170 through the intervention of a transmission mechanism 207, 208, 209, 210, 211. This transmission mechanism comprises a slide 207 which is provided with an oblong hole **207*a* straddling a stud 208 of a lever 209. Lever 209 which is tiltably journalled on a stationary shaft 212 is connected to an angle lever 210 likewise journalled on shaft 212. Angle lever 210 has pivotally connected thereto a supporting arm 211 of bar 170. In a manner not shown in the drawing, an analogues transmission mechanism is arranged between pushrod 292 and printing hammer release rail 206 or bar 170 respectively as an image to the transmission mechanism 207 to 211**.

A still further cam disc 293 is mounted on shaft 262, which is engaged by a roller 294 of a roller lever 295 rotatably journalled on shaft 278. A stud 213 is arranged opposite roller 294 at roller lever 295, said stud 213 extending into a slot 214 of clearing lever 215. Clearing lever 215 is rotatably journalled on a bolt 216 of wall 115 and has its upper free end provided with a gear segment 217 which meshes with a clearing pinion 218 of shaft 149.

*Operation of the device of FIGS. 3a, 3b, 3c*

The operation of the decoding device shown in FIGS. 3*a* to 3*c* is as to function similar to that of FIGS. 1*a* to 1*c* and 2*a* to 2*c*. However, the load on the various driving and driven members of the device and also the danger of overriding of these elements is considerably reduced in the arrangement according to FIGS. 3*a* to 3*d*. It may be assumed that the value "9" is supposed to be adjusted in type wheel 157. On the basis of the customary code 8–4–2–1 the decimal value "9" is formed by the binary information L 0 0 L. Thus, the electronic computer will put out a bit in the first and in the last digit or time period. The first bit corresponds to the decimal value "8," the bit in the last digit corresponds to the decimal value "1." The conversion of the code 8–4–2–1 without the intervention of electronic means, as for instance converting matrices or the like, into the special code 4–4–2–1 is effected in the following manner.

The value "9" in the special code 4–4–2–1 is represented by the sequence 4–4–0–1. In the first digit or time period, the electronic computer will put out a bit "8." The electromagnet 254 (FIG. 3*b*) will rotate lever 261 in clockwise direction by means of pushrod 260 acting upon extension 255. In this way, extension 141 will be located underneath nose portion 143 of storing lever 142. Even upon passage of the impulse through the electromagnet, lever 261 will remain in its disengaged position. During the tilting of lever 261, extension 141 will release the abutment 139 resting against its front face. Arm 123 will be rotated in clockwise direction by spring 138, gear 121 or, more specifically, the guiding ring 122 will slide on shaft 245 towards the left until gear 121 will mesh with storing gear 148.

Upon actuation of lever 261 by electromagnet 254, electromagnet 240 or pushrod 229 thereof will actuate clutch 231 through the intervention of control armature 238. Shaft 117 will carry out a partial revolution of approximately 105°. During this revolution, decoding wheel 124 will be rotated in clockwise direction, the teeth 221 thereof will engage pinion 247 and will rotate shaft 245 by four steps. These four steps are transferred by gear 121 to storing gear 148 whereby the latter is rotated in the direction of the arrow *c*. Simultaneously, the value "4" will be transmitted to printing type wheel 157 through gears 155, 156. Thus, the first partial revolution of clutch 230, 231, 232 is carried out and shaft 117 is rotated by 105°.

Thereupon, the second partial revolution is carried out. The electronic computer will transmit no impulse to electromagnet 254, however, a starting impulse upon electromagnet 240. This starting impulse will actuate once again clutch 230, 231, 232. Since, as described above, storing lever 142 with its nose portion 143 keeps lever 261 arrested in its disengaged position, gear 121 will remain in meshing engagement with storing gear 148. During the next partial revolution of clutch 230, 231, 232 by for instance 105°, the teeth 222 will advance shaft 245 by four steps through the intervention of pinion 247 and these four steps are transferred to storing wheel 148 and through the intervention of gears 155, 156 to printing type wheel 157.

Towards the end of the second partial revolution, clearing rod 194 will from underneath abut extension 144 and will rotate storing lever 142 against the thrust of spring 146. Thus, nose portion 143 will release lever 261. Since electromagnet 254 which is energized in an impulse-like manner only, will not act upon lever 261, spring 257 will return lever 261 so that it will rest with its extension 141 from underneath against abutment 139. Only upon disengagement of gears 121, i.e. upon tilting movement of arms 123 by comb-shaped rail 147, will extension 141, which up to then has rested against nose portion 143 of storing lever 142, and thereby lever 261 return to its rest position.

Thus, lever 261 may occupy three positions, namely the zero (rest) position, one (on) position, and intermediate position following completion of the operation and prior to the return of clutch 121, 123.

As shown in FIG. 3*b*, the curved surface 182 of cam disc 180 is provided with a protrusion located at least between the second and third and the third and fourth position which will become effective at the latest at the beginning of the new partial revolution. This protrusion will pull comb-shaped rail 147 towards the right through the intervention of roller 184 and will rotate arms 123 against the thrust of spring 138 to such an extent that the abutments 139 will release the extensions 141 of levers 261 having returned to their respective rest position and will rest against the respective end face of the latter. FIG. 3*b* will show such a protrusion of surface 182 for disengaging the gears 121 through the intervention of comb-shaped rail 147 at the end of the first partial revolution. Inasmuch as lever 261 is arrested by storing lever 142 between the first and second partial revolution, the axial movement of gears 121 would be ineffective, since between these two positions in discs, 192, 193 no clearing rod is provided which would engage or lift extension 144. It is, of course, to be understood that accordingly the deviating curved section at cam discs 180, 181 may be eliminated in the first phase so that after the first partial revolution no axial movement will occur.

Towards the end of the second partial revolution, the comb-shaped rail 147 is disengaged, and lever 261 will thus occupy its rest position at the beginning of the third partial revolution. In this position, the electronic computer will not feed a counting or calculating impulse to electromagnet 254 but only an advancing impulse to electromagnet 240. Therefore, control armature 238 will actuate clutch 230, 231, 232 so that shaft 117 will carry out a further partial revolution of approximatelly 80°. In this phase the two teeth 223 of decoding wheel 124 will mesh with pinion 247. However, since gear 121 is not in meshing engagement with storing gear 148, the latter as well as printing type wheel 157 will not be rotated.

Prior to the energization of electromagnet 240 for the last partial revolution of clutch 230, 231, 232, the computer will feed again an impulse to electromagnet 254 which will be stored by storing lever 142 up to the start of the movement of clutch 230, 231, 232. Gear 121 is again moved in axial direction into engagement with storing gear 148 by spring 138. During meshing engagement of tooth 118 in pinion 247, storing gear 148 and thereby printing type wheel 157 is advanced by one step. These two gears 148 and 157 now show the decimal value "9." Towards the end of the fourth partial revolution which may amount for instance to 70°, the cam surface 188 of cam disc 189 or shaft 262 which has already been set in motion will engage pin 187 of lever 185 and will move comb-shaped rail 147 into uncoupled position. Furthermore, clearing rod 196 will tilt storing lever 142 due to engagement with extension 144 so that lever 142 will release lever 251.

Clutch 256, 267, 266 actuated by cam disc 268 of shaft 117 through the intervention of intermediate linkage 284, 282, 280 and hollow shaft 271 and lever 270 will drive cam discs 287, 288, 204 and 293 through the intervention of shaft 262. Printing mechanism collecting rail 206 will be tilted into releasing position by roller levers 289, 290 cooperating with cam discs 287, 288 through the intervention of pushrod 291, 292 and tilting arms 205. Subsequently, roller lever 289, 290 will actuate bar 170, i.e. will lift the same. If the respective storing gear 148 of a digit has been rotated from "0" to a certain value, cam disc 175 will release arm 174, lever 168 will release pushrod 165 and the latter will engage bar 170 with its edge 166 under the influence of spring 167 so that step 169 will straddle bar 170. Bar 170 moving in upward direction will rotate lever 161 to such an extent that the hook 160 thereof will release the nose portion 159 of printing hammer plate 158. In view of the thrust of a spring (not shown in the drawing) printing type wheel 157 will be pressed against the ribbon of the printing roller or platen. During the course of the further revolution of shaft 262 collecting bar 206 will return the printing hammer plates 158 to their starting position and with such an overstroke that the returning hooks 160 may straddle the nose portions 159 in an unimpeded manner.

During the rotation of shaft 262 during the end phase of the movement of decoding transmission 124, 247 or subsequently thereto, the roller lever 295 journalled on shaft 278 will be rotated by cam disc 293 after a rotation of shaft 262 of approximately 180°. Roller lever 295 will, by means of pin 214, rotate the clearing segment 215, 217 which in turn will rotate clearing shaft 149 in counterclockwise direction through the intervention of clearing pinion 218. During this movement clearing hooks 152 which are coupled to shaft 149 by follower 153 and longitudinal groove 154 will with their abutments 151 engage the extensions 150 of storing gears 148 sooner or later depending on the value which was previously transferred to storing gears 148. Clearing members 152 will rotate gears 148 and will return the printing type wheels 157 to their zero or starting position through the intervention of gears 155, 156. Subsequently, clearing pinion 218 will be returned to the position of extension 150 represented by the value "9" or "11" respectively. The gears 148 will be held in this position by lever 177 or nose portion 179 respectively.

Towards the end of revolution of shaft 262 roller 199 will engage the depression 198 of cam disc 197. In this way shaft 262 will be adjusted in its proper position in non-positive manner by spring 219 engaging roller lever 200.

As has been explained in the preceding portion in connection with the input of the value "9," also the value "8" will be composed of two times "4," i.e. the first impulse of the first step representing an "8" of the computer will be stored by lever 142 and will therefore not be cleared after the first partial calculation with four decimal value steps. During the second partial calculation the information is fed into the device as if it had been fed thereinto for the first time. In a similar manner, the comma and the decimal point which correspond to a decimal value combination of the electric impulses of "10" and "11" will be composed of two times four plus two and two times four plus one respectively.

It is, of course, to be understood that the present invention is, by no means, limited to the particular constructions shown in the drawings but also comprises any modifications within the scope of the appended claims.

What I claim is:

1. In a device for converting binary coded decimal values into decimal values, into which device the binary bits are fed for all decimal digits simultaneously and within each decimal digit consecutively; frame means, a decoding wheel rotatably journalled in said frame means and provided with four spaced groups of circumferential teeth, the number of teeth of the respective group corresponding to the binary code according to which the binary values are fed into the device, actuating means for stepwise advancing said decoding wheel by angles corresponding to the spacing between said groups of teeth in response to impulses fed into said device, gear means extending into the path of movement of said groups of teeth and being movable thereby by a number of teeth corresponding to the number of teeth of the respective group of teeth on said decoding wheel meshing with said gear means, a plurality of decimal value storing means respectively associated with said decimal digits, and a plurality of control means respectively associated with said digits and operable in response to impulses fed into said device to selectively establish and interrupt driving connection between said gear means and the decimal value storing means of the respective digit.

2. A device according to claim 1, in which said actuating means includes motor means and also includes clutch means for effecting and interrupting driving connection between said motor means and said decoding wheel in response to impulses fed into said device.

3. A device according to claim 2, in which said actuating means includes electromagnetic means operable to actuate said clutch means for effecting driving connection between said motor means and said decoding wheel.

4. A device according to claim 1, in which the groups of teeth have one, two, four and eight teeth respectively in conformity with a 1–2–4–8 binary code.

5. A device according to claim 1, in which said decoding wheel is rotatable by said actuating means through a complete revolution in response to four impulses fed into the device.

6. A device according to claim 1, which includes a shaft rotatably journalled in said frame means, said gear means being formed by a pinion connected to said shaft for rotation therewith and said decimal value storing means being formed by gear rack means adapted to be drivingly connected to said shaft by said control means.

7. A device according to claim 6, which includes a plurality of pinion means respectively connected to said shaft for rotation therewith and in which each of said control means comprises lever means rotatably supported in said frame means and also comprises gear means for meshing engagement with the pinion means and the gear rack means of the respective digit.

8. A device according to claim 7, which includes a plurality of electromagnetic means respectively operatively connected to said lever means for rotating the same to thereby interrupt meshing engagement of the gear rack means and the gear means of the respective digit.

9. A device according to claim 1, to which device the binary bits are fed in an 8–4–2–1 binary code, in which the groups of teeth have four teeth, four teeth, two teeth, and one tooth respectively, a plurality of means respectively operatively connected to said control means and operable in response to the feeding of a binary eight into the respective digit to maintain driving connection between the respective decimal value storing means and said gear means over a period corresponding to the meshing engagement of said gear means with said groups of teeth comprising four teeth each.

10. A device according to claim 9, in which said gear means is formed by a pinion.

11. A device according to claim 1, which includes a plurality of first lever means respectively cooperating with said control means and also including a plurality of second lever means respectively cooperating with said first lever means and said control means, electromagnetic means operatively connected to said first lever means, said first lever means normally occupying a first position in which it interrupts driving connection between the respective control means and said gear means and being adapted to be moved by said electromagnetic means into a second position in which it establishes driving connection between the respective control means and said gear means, said second lever means being adapted to arrest said first lever means in said second position at least until said decoding wheel has been advanced by said actuating means in response to an impulse fed into said device.

12. A device according to claim 11, in which said groups of teeth have four teeth, four teeth, two teeth, and one tooth respectively and in which said second lever means is adapted to arrest said first lever means over a period corresponding to the meshing engagement of said gear means with said groups of teeth comprising four teeth each.

13. A device according to claim 12, which includes clearing means drivingly connected to said actuating means and operable to move said second lever means into a position in which the latter releases said first lever means from said second position into an intermediate position, said control means including means operable to hold said first lever means in said intermediate position, and means operatively connected to said control means for returning the same into driving connection effecting position in which said control means releases said first lever means for return to said first position.

14. A device according to claim 13, in which said second lever means includes means extending into the path of movement of said clearing means, and in which said clearing means is provided with means effecting movement of said second lever means into releasing position during meshing engagement of said gear means with the three last mentioned groups of teeth only.

15. A device according to claim 14, which includes a shaft rotatably journalled in said frame means and supporting both said clearing means and said decoding wheel.

16. A device according to claim 15, in which said clearing means includes a plurality of disc means arranged in axially spaced relationship to each other on said shaft and also includes three rod means supported in said disc means in substantially parallel relationship to said shaft and spaced in circumferential direction of said shaft.

17. A device according to claim 11, in which said first lever means is provided with extension means and in which said second lever means is provided with means adapted to arrest said extension means in said second position of said first lever means, spring means continuously urging said second lever means into first lever arresting position.

18. A device according to claim 1, in which each of said decimal value storing means includes storing gear means rotatably journalled in said frame means, and in which each of said control means includes coupling gear means axially displaceably supported in said frame means, means engaging said coupling gear means for axially displacing the same into meshing engagement with said storing gear means in response to impulses fed into said device, and clearing means operatively connected to said coupling gear means for interrupting meshing engagement between said storing gear means and said coupling gear means.

19. A device according to claim 18, which includes a shaft rotatably supporting said storing gear means, and in which said clearing means includes a plurality of means respectively fixed connected to said shaft and respectively provided with extension means, said storing gear means including means respectively extending into the path of movement of said extension means for returning said storing gear means to their respective rest position.

20. A device according to claim 19, which includes a pinion fixedly connected to said shaft for rotation therewith, a gear segment in meshing engagement with said pinion, and means rotatably journalled in said device and adapted to advance said gear segment to thereby rotate said pinion and said shaft and clear said storing gear means following one complete revolution of said decoding wheel.

21. A device according to claim 18, in which each coupling gear means is provided with guiding means, each of said control means including an arm in engagement with said guiding means of the respective coupling gear means and pivotally supported in said frame means, spring means continuously urging said arm in a direction in which the respective coupling gear means is in meshing engagement with the respective storing gear means, said clearing means including rail means common to all of said arms and adapted to move said coupling gear means out of meshing engagement with said storing gear means.

22. A device according to claim 21, which includes cam disc means drivingly connected to said decoding wheel, said rail means being provided with means extending into the path of movement of said cam disc means and being adapted to be displaced thereby in axial direction of said decoding wheel.

References Cited

UNITED STATES PATENTS 3,025,510 3/1962 Lovejoy ------------ 340—347

3,230,454 1/1966 Burkleo ------------ 340—357
3,234,546 2/1966 Ellner et al. -------- 340—347
3,248,700 4/1966 Sinn -------------- 340—357

MAYNARD R. WILBUR, *Primary Examiner.*

G. R. EDWARDS, *Assistant Examiner.*

U.S. Cl. X.R.

235—61; 340—347